(12) United States Patent
Li

(10) Patent No.: US 12,135,904 B2
(45) Date of Patent: Nov. 5, 2024

(54) FOLDING ZONE MANAGEMENT OPTIMIZATION IN STORAGE DEVICE

(71) Applicant: Western Digital Technologies, Inc., San Jose, CA (US)

(72) Inventor: Xiaoying Li, Fremont, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/352,156

(22) Filed: Jul. 13, 2023

(65) Prior Publication Data

US 2024/0168683 A1 May 23, 2024

Related U.S. Application Data

(60) Provisional application No. 63/427,416, filed on Nov. 22, 2022.

(51) Int. Cl.
*G06F 3/06* (2006.01)

(52) U.S. Cl.
CPC .......... *G06F 3/0659* (2013.01); *G06F 3/0619* (2013.01); *G06F 3/0688* (2013.01)

(58) Field of Classification Search
CPC ..... G06F 3/0659; G06F 3/0688; G06F 3/0619
USPC .......................................................... 711/154
See application file for complete search history.

(56) References Cited

U.S. PATENT DOCUMENTS

| | | | |
|---|---|---|---|
| 9,092,340 B2 | 7/2015 | Sprouse et al. | |
| 9,396,107 B2 | 7/2016 | Lee et al. | |
| 10,990,526 B1 | 4/2021 | Lam et al. | |
| 11,036,407 B1* | 6/2021 | Tikoo | G06F 3/0653 |
| 11,200,161 B2 | 12/2021 | Bennett et al. | |
| 2011/0153912 A1 | 6/2011 | Gorobets et al. | |
| 2019/0102102 A1 | 4/2019 | Natarajan et al. | |
| 2020/0194075 A1* | 6/2020 | Igahara | G11C 16/08 |
| 2020/0272356 A1* | 8/2020 | Zhang | G06F 3/0604 |
| 2020/0356306 A1* | 11/2020 | Subbarao | G06F 3/0673 |
| 2021/0223962 A1* | 7/2021 | Esaka | G06F 3/064 |
| 2022/0019370 A1* | 1/2022 | Bhardwaj | G06F 3/0604 |
| 2022/0050627 A1 | 2/2022 | Pratt | |
| 2022/0113905 A1* | 4/2022 | Agarwal | G06F 3/0631 |
| 2022/0382454 A1* | 12/2022 | Yang | G06F 12/0246 |

(Continued)

FOREIGN PATENT DOCUMENTS

CN 102760101 B 3/2015

*Primary Examiner* — Than Nguyen
(74) *Attorney, Agent, or Firm* — Morgan, Lewis & Bockius LLP

(57) ABSTRACT

A data storage device for providing zone management optimization may include memories including staging memory areas (e.g., single level cells) and destination memory areas (e.g., quad-level cells). The destination memory areas may include memory regions (e.g., zones). A controller may be configured to receive data from a host system, write the data initially to the staging memory areas, receive a region full indication for a first memory region. In response to receiving the region full indication, the controller may add a first entry corresponding to the first memory region to a double linked list. The controller may select, using a region selection randomization method, a second entry corresponding to a second memory region, and folds a second data to the second memory region. The first data may be associated with the first memory region and the second data may be associated with the second memory region.

20 Claims, 7 Drawing Sheets

(56) References Cited

U.S. PATENT DOCUMENTS

| | | | |
|---|---|---|---|
| 2023/0290419 A1* | 9/2023 | Yang | G11C 16/08 |
| 2023/0342060 A1* | 10/2023 | Koparde | G06F 3/0644 |
| 2024/0094923 A1* | 3/2024 | Wakutsu | G06F 3/0679 |

* cited by examiner

FOLDING ZONE MANAGEMENT OPTIMIZATION IN STORAGE DEVICE

CROSS-REFERENCE TO RELATED APPLICATION

This application claims the benefit of U.S. Provisional Application No. 63/427,416, filed on Nov. 22, 2022, the entirety of which is incorporated herein by reference for all purposes.

BACKGROUND

Zoned namespace (ZNS) is a solid state device (SSD) namespace architecture in which a non-volatile memory is divided into fixed-sized groups of logical addresses or zones. Each zone may be used for a specific application. For example, a host may cause an SSD to write data associated with different applications into different zones. Zones may spread across a single die or multiple dies, with each zone generally spanning 48 MB or 64 MB of size. The SSD (or a flash storage device) may interface with the host to obtain the defined zones, and map the zones to blocks in the non-volatile memory (or flash memory). Thus, the host may cause writing separate application-related data into separate blocks of flash memory.

Traditionally, data in an SSD (or a flash storage device) may be invalidated in small chunks (e.g., 4 KB of data), for example, when a host causes the SSD (or the flash storage device) to overwrite the data. To remove the invalidated data from the flash memory, the flash storage device may perform a garbage collection (GC) process in which valid data may be copied to a new block and the invalidated data is erased from the old block. However, in ZNS, a zone is sequentially written before the data in the zone is invalidated, and thus the entire zone may be invalidated at once (e.g., 48 or 64 MB of data). This feature of ZNS reduces or eliminates GC, which in turn reduces write amplification (WA). As a result, ZNS may optimize the endurance of an SSD (or a flash storage device), as well as improve the consistency of input/output (I/O) command latencies.

There are architectures similar to ZNS for managing regions of data, such as explicit streams or region management. Both ZNS and other data-placement systems (such as the Open Channel) use a mechanism in which the host may implicitly or explicitly cause the SSD (or the flash storage device) to open a specific range for write, which may be mapped to an open block or to a holding buffer. In non-ZNS advanced data-placement, a region may be written in any order, and closed by the host (via the SSD) or by a timeout. Once closed, a region is expected to stay immutable, although the host is permitted to overwrite it (via the SSD) at any time, incurring a cost in write amplification. Both regions and zones have a limited open lifetime. Once a region or zone is open for longer than the time limit, the SSD or a flash storage device) may close it autonomously in order to maintain resource availability. Host-managed streaming systems allow out of order writes within each provided region. Hence, the system may have single-level cell (SLC) buffers for region writes and then flush to capacity blocks on closure.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing folding zone management optimization in a data storage device.

Figure 1:
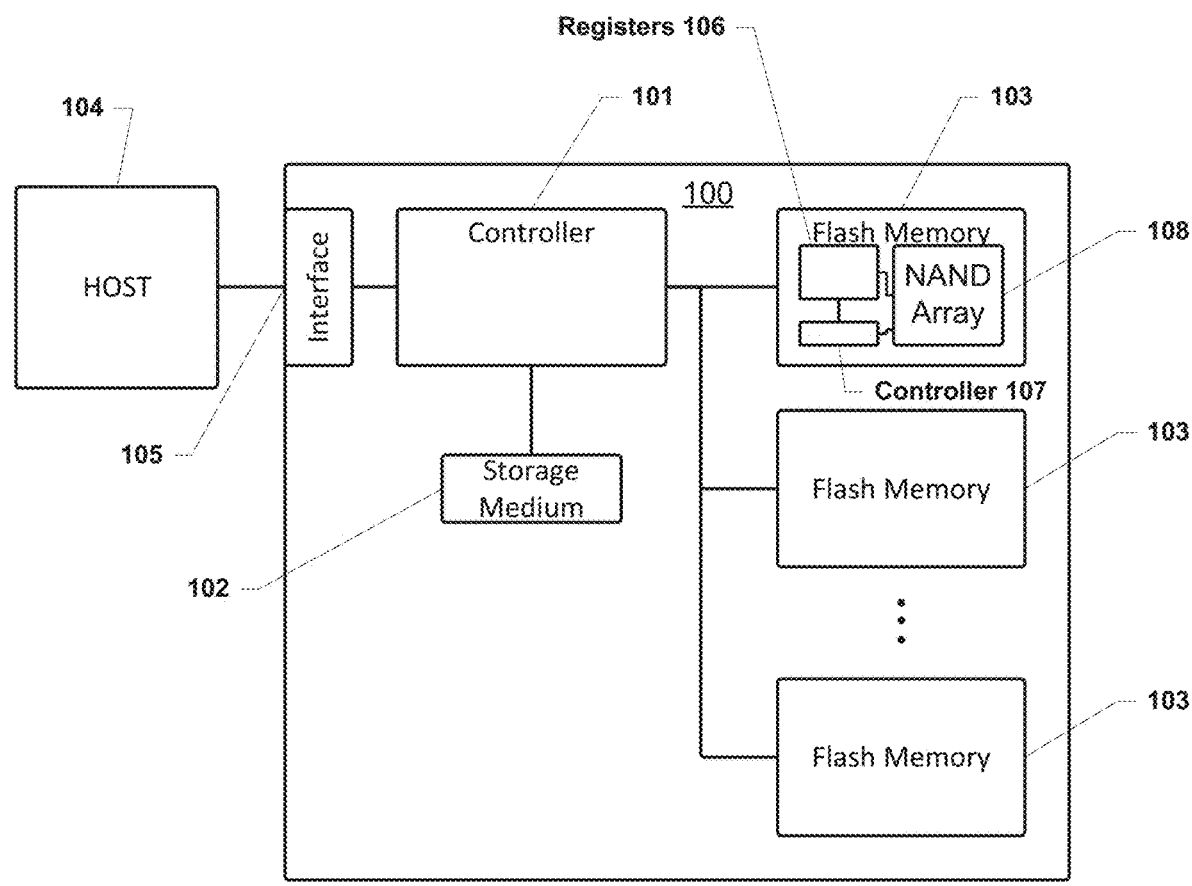
FIG. 1 is a block diagram illustrating components of an example data storage system, according to one or more embodiments.

FIG. 1 is a block diagram illustrating components of an example data storage system, according to aspects of the subject technology. A data storage system may be sometimes referred to as a system, a data storage device, a storage device, or a device. As depicted in FIG. 1, in some aspects, a data storage system 100 (e.g., a solid-state drive (SSD)) includes a data storage controller 101, a storage medium 102, and a flash memory array including one or more flash memory 103. The controller 101 may use the storage medium 102 for temporary storage of data and information used to manage the data storage system 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some aspects, the elements of the controller 101 may be integrated into a single chip. In other aspects, these elements may be separated on their own personal computer (PC) board.

In some implementations, aspects of the subject disclosure may be implemented in the data storage system 100. For example, aspects of the subject disclosure may be integrated with the function of the data storage controller 101 or may be implemented as separate components for use in conjunction with the data storage controller 101.

The controller 101 may also include a processor that may be configured to execute code or instructions to perform the operations and functionality described herein, manage request flow and address mappings, and to perform calculations and generate commands. The processor of the controller 101 may be configured to monitor and/or control the operation of the components in the data storage controller 101. The processor may be a microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media.

In some aspects, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some aspects, the storage medium 102 represents volatile memory used to temporarily store data and information used to manage the data storage system 100. According to aspects of the subject technology, the storage medium 102 is random access memory (RAM), such as double data rate (DDR) RAM. Other types of RAMs may be also used to implement the storage medium 102. The memory 102 may be implemented using a single RAM module or multiple RAM modules. While the storage medium 102 is depicted as being distinct from the controller 101, those skilled in the art will recognize that the storage medium 102 may be incorporated into the controller 101 without depart-ing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fibre channel interface, a peripheral component interconnect express (PCIe), a serial advanced technology attachment (SATA), a universal serial bus (USB), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101. The host interface 105 (or a front end of the controller 101) may include a submission queue 110 to receive commands from the host device 104. For input-output (I/O), the host device 104 may send commands, which may be received by the submission queue 110 (e.g., a fixed size circular buffer space). In some aspects, the submission queue may be in the controller 101. In some aspects, the host device 104 may have a submission queue. The host device 104 may trigger a doorbell register when commands are ready to be executed. The controller 101 may then pick up entries from the submission queue in the order the commands are received, or in an order of priority.

The flash memory 103 may represent a non-volatile memory device for storing data. According to aspects of the subject technology, the flash memory 103 includes, for example, a not-and (NAND) flash memory. The flash memory 503 may include a single flash memory device or chip, or (as depicted in FIG. 1) may include multiple flash memory devices or chips arranged in multiple channels. The flash memory 103 is not limited to any capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some aspects, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some aspects, a command register is included to control parity, interrupt control, and the like. In some aspects, the internal flash controller 107 is accessible via a control register to control the general behaviour of the flash memory 103. The internal flash controller 107 and/or the control register may control the number of stop bits, word length, receiver clock source, and may also control switching the addressing mode, paging control, coprocessor control, and the like.

A solid state drive (SSD) or solid state storage may use negative-AND (NAND) flash memory cells for its high density and low cost per cell relative to other generally available non-volatile memory technology. Each NAND memory cell can be programmed to store one or more bit. A single level cell (SLC) flash memory may be programmed to store one bit per cell. Some flash memory may have cells that can store two or more bits per cell. This type of flash memory is generally referred to as multi-level cell (MLC) flash memory. Some specific examples are triple-level cell (TLC) flash memory that can store 3 bits per cell and quad-level cell (QLC) flash memory that can store 4 bits per cell. In general, more read and write cycles are used to access data in NAND flash memory configured to store more bits per cell. For ease of explanation, the description herein uses QLC as an example, but TLC may be used instead of, or in addition to the QLC. The techniques described herein apply to any type of MLC flash memory. In FIG. 1, the NAND arrays 108 may include SLCs, TLCs, and/or QLCs. In the description that follows, the SLCs are an example of staging memory areas and the TLCs and QLCs are an example of destination memory areas.

The ZNS model as defined in non-volatile memory express (NVMe) does not require a specific operating model for a data storage device but is designed to optimize host behavior towards a certain level of sequential access in order to reduce write amplification. There are a number of device implementation models. For example, with many small open zones, zones are sized to internal structures, such as a die-block, and are typically separated out into capacity storage after being first written to an intermediate buffer such as SLC. A closed zone may reside in quad-level cells (QLCs) or a similar location, and the data storage device allows many open zones. With few large zones, zones are incrementally written to a final location, and the number of zones that can be simultaneously written is limited by the number of parity buffers that can be maintained in parallel. This model may also include a zone random write area (ZRWA) stored in dynamic random access memory (DRAM) or in SLC. Some systems may use other methods to manage regions of data, such as explicit streams or region management. Host-managed data placement systems use a mechanism in which the host may implicitly or explicitly open a specific range for write, which may be mapped to an open block or to a holding buffer. With non-sequential zoning systems (e.g., Open Channel), a region may be written in any order, and closed by the host or by a timeout. Once closed, it is expected to stay immutable, although the host is permitted to overwrite it at any time, incurring a cost in write amplification. Both regions and zones have a limited open lifetime. Once a region or zone is open for longer than the time limit, the data storage device may close it autonomously in order to maintain resource availability. Host-managed streaming systems may allow out of order writes within each provided region. Hence, the data storage device would have SLC buffers for region writes and then flush to capacity blocks on closure. The region writes may be cached in buffers (e.g., SLC buffers). Any out of order data can be written here. When the out of order data is moved to capacity blocks (e.g., tri-level cells or TLC), the data may be arranged in order prior to writes. The zones in ZNS devices are similar to regions in other host-data placement models. In the description that follows, zones and regions may be used interchangeably, and the techniques described herein are applicable to host-managed data placement protocols.

In some aspects, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some aspects, the controller 101 may be configured to execute a read operation independent of the host 104 (e.g., to verify read levels or BER). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The controller 101 may perform the operations identified in blocks 702-712. The controller 101 may cause the operations identified in blocks 702-712 to occur, or the controller 101 may provide instructions to cause or facilitate the controller 107 (and the registers 106) to perform operations identified in blocks 702-712.

Figure 2:
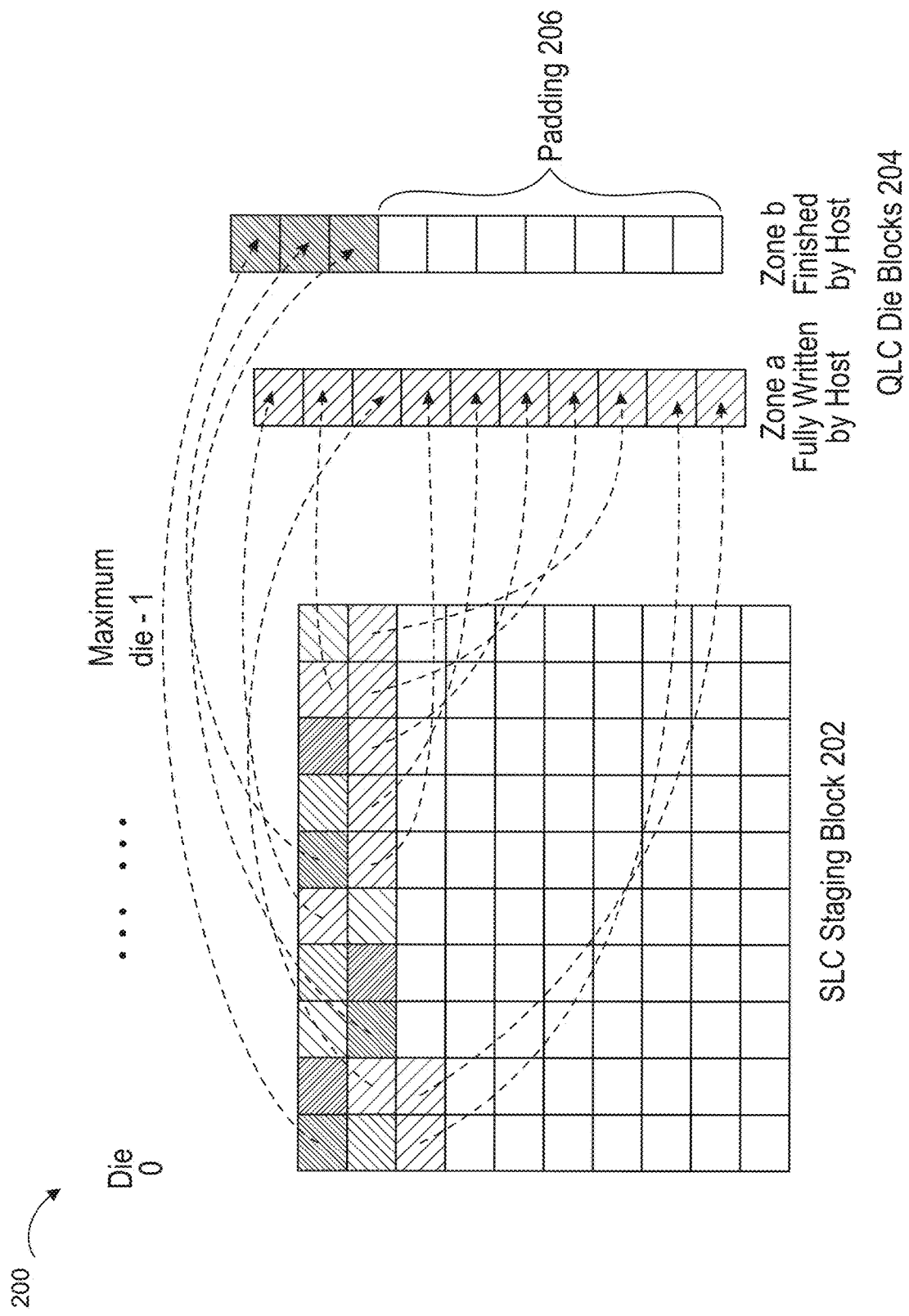
FIG. 2 illustrates an example folding of data from a single-level cell (SLC) staging block to quad-level cell (QLC) die blocks, according to one or more embodiments.

FIG. 2 illustrates an example folding 200 of data from an SLC staging block 202 to QLC die blocks 204, according to some embodiments. For ZNS devices, host data may be initially written to SLC blocks. Host may write to a zone and subsequently indicate that the zone is a FULL state, either by writing the zone fully, or by sending a zone management send (ZMS) zone finish command. When a zone becomes FULL state under either of these two conditions, the data of this zone that resides in SLC block may be copied (as indicated by the dotted lines) to QLC die block(s) by a folding operation. When a zone is partially written and made FULL by zone finish command, the part of data that was not written by host may be padded (206) by the folding operation. The SLC block serves as a staging block for host data. The zones that are still in the SLC staging block are called staging zones. The FULL zones that are in SLC staging block are called SLC full zones, which is sometimes called a folding candidate. Staging zones could include SLC active zones and SLC full zones. FIG. 2 shows an SLC staging block 202 that includes pages (sometimes referred to as data). Each entry in the two-dimensional array corresponds to a page that may be located in one of the dies 0, . . . , maximum die−1. Pages that correspond to a single zone are shown using a same pattern. When the host indicates that a zone is FULL, the controller 101 and/or the controller 107 may fold data corresponding to the zone to a corresponding QLC die block. In the example shown, host indicated that zone a was fully written, so data corresponding to the zone is folded to a QLC die block. The host also indicated that zone b has finished, via a ZMS finish command, so the data corresponding to that zone is folded to a QLC die block. The folding for zone a did not require padding, whereas the folding for zone b required padding (206). In this way, the folding operation may include copying of data from the SLC block to one or more QLC die blocks, and may include padding.

Figure 3:
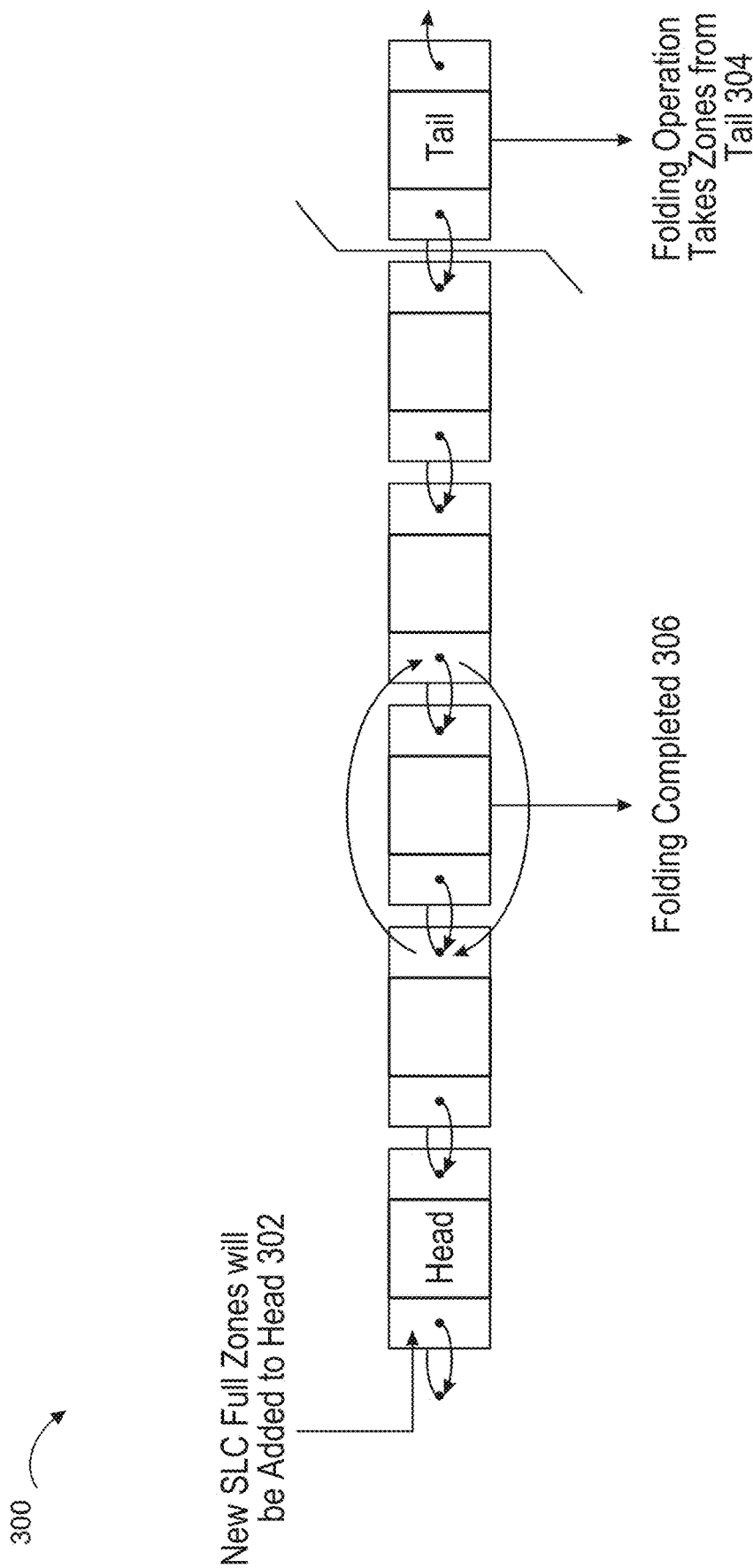
FIG. 3 shows an example double linked list data structure for tracking SLC full zones that may be folded to QLC die block(s), according to one or more embodiments.

FIG. 3 shows an example double linked list data structure 300 for tracking SLC full zones that may be folded to QLC die block(s), according to some embodiments. The SLC full zones may be efficiently added to and removed from the list. The information in the double linked list data structure (sometimes referred to as SLC full zone list head 302) may be used when these full zones are copied from SLC staging block to a destination QLC die block. When a zone becomes FULL, the zone may be added to the SLC full zone list head. Folding may take zones from the tail 304 of the SLC full zone list. The zone that becomes FULL earlier may be folded earlier. When one zone is folded and verified successfully, the SLC full zone (e.g., 306) may be removed from the double linked list.

To achieve QLC die parallelism when folding zones to QLC block, a flash translation layer of the controller 101 may start folding only after a predetermined number of SLC full zones are available for folding. The QLC destination die selection may follow certain order, so that all QLC dies will be busy folding at the same time as much as possible. If host finishes zones (either by writing or by issuing a ZMS command) and then reset them in certain order, the QLC blocks could be freed up unevenly, causing some QLC dies to have less free blocks than the others. In extreme case, all blocks from one QLC die may become free and all the other dies may have lower free blocks. When some QLC die block runs out of free block, folding may be performed with lower die parallelism, which may result in poor folding performance.

Figure 4:
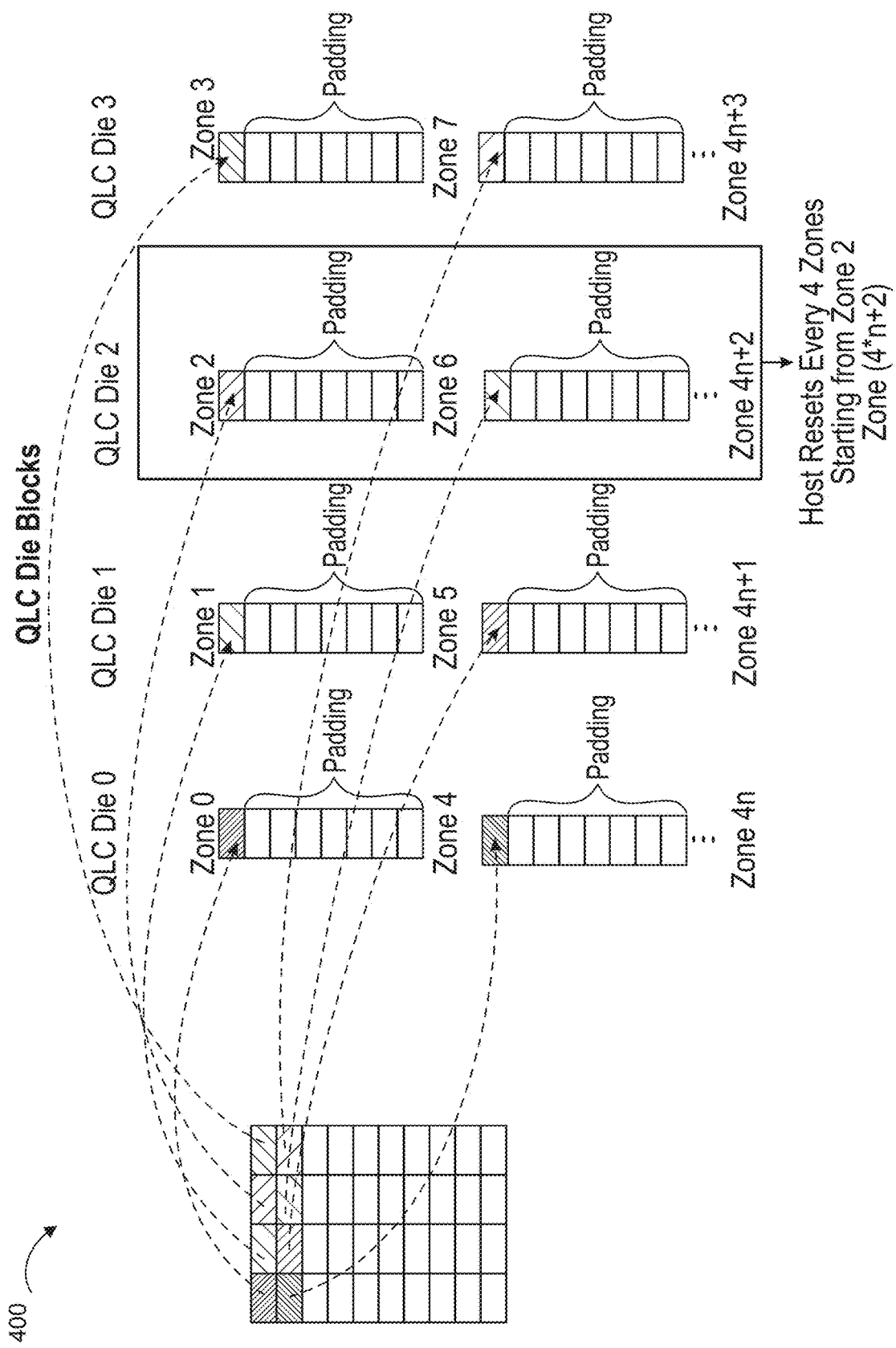
FIG. 4 illustrates an example scenario for poor folding performance.

FIG. 4 illustrates an example scenario 400 for poor folding performance. When host finishes and resets zones in a specific pattern, this pattern may cause uneven QLC free block across dies. The example in FIG. 4 is a simplified illustration, where host writes and finishes zones 0 to 7 sequentially (as indicated by the different patterns in the SLC staging block), using a round robin method for QLC die selection (selecting between QLC dies 0 to 3), and the system has four die parallelism (i.e., each of the LC dies 0 to 3 may be written to concurrently). The example shows uneven QLC free blocks across dies caused by certain host access pattern, which includes the host resetting every 4 zones starting from zone 2.

Figure 5:
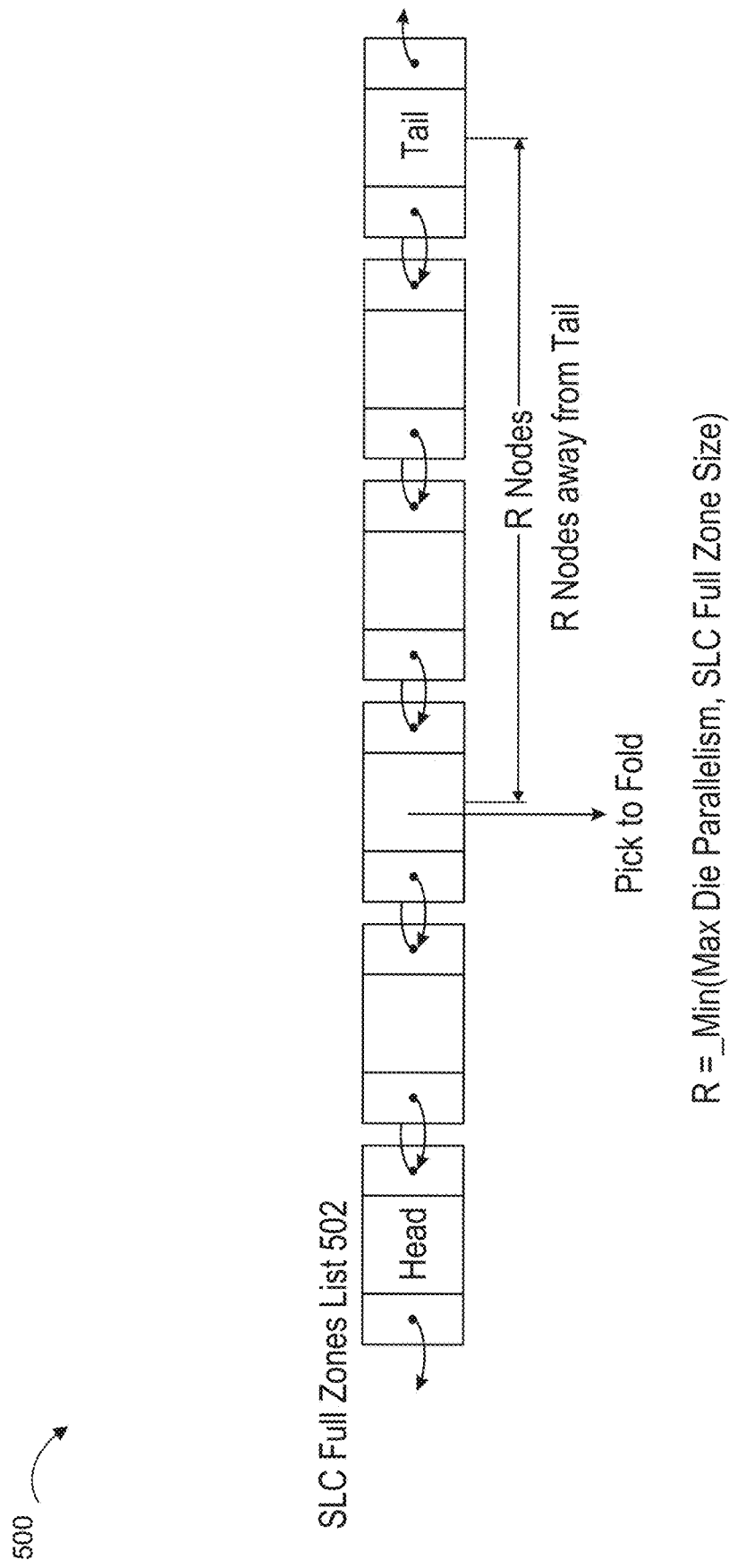
FIG. 5 illustrates example randomization of the folding zone selection from a SLC full zone list, according to one or more embodiments.

This problem may be addressed in different ways. One way is to randomize the QLC destination die block selection during folding. But this method makes it hard to also achieve the maximum die parallelism as much as possible. Instead, some aspects randomize the folding zone selection from the SLC full zone list. When selecting a zone to fold, instead of selecting the zone from the tail of the linked list, the FTL may choose a random value R between 0 and minimum of (max die parallelism, linked list size), and select the zone R nodes away from the tail of the double linked list to fold. FIG. 5 illustrates an example randomization 500 of the folding zone selection from a SLC full zone list 502, according to one or more embodiments. In this way, the techniques described herein may avoid the potential uneven usage across QLC dies resulting from certain host access pattern.

In some aspects, the FTL starts to move zones from an SLC staging block to a QLC block when occupied SLC space is higher than certain threshold (for example, 50%), or the number of FULL zones reaches a certain threshold (for example, 10% of the capacity), whichever is reached earlier. The FTL firmware may try to match the folding (QLC write) pace with host write (SLC write). But host can write a small amount of data to a zone and then make it FULL by sending zone finish command quickly. Typically, the data that needs to be written to a QLC die block is much more than the data written to an SLC block. It is difficult for the storage device to keep up with the host writes when the storage device has to copy only a small amount of host data but having to pad the remaining data to a final QLC destination block. In the worst case, the number of staging zones could grow to be close to the total zone number (e.g., 650 Kilobytes for a 32 Terabyte device). Additionally, the list of staging zones should be maintained across graceful shutdown (GSD) and power-loss prevention (PLP). If a whole double link list of the staging zones is directly saved to the flash memory, it will require a large amount of PLP budget, which is already very small for ZNS firmware. For example, many modules in the storage device needs to save data on a PLP event. Saving a large amount of data requires a large capacitor for charging during the PLP event. The larger the capacitor used for PLP, the more expensive it is. Hence, there is a need to minimize the data saved during PLP as much as possible.

In normal host access pattern, the number of staging zones is typically within twice of maximum active zones (e.g., 4096 times 2) allowed by ZNS specification. The techniques described herein may be used to reduce the amount of data needed to be saved across GSD and PLP by only saving the staging zones with the linked list up to twice of maximum active zones. The extra staging zones may be saved in an array without the linked list information. The order of the zones becoming full may not be maintained, but it is acceptable in the extreme case. Using these techniques, the amount of the data needs to be saved is almost reduced by half.

Figure 6:
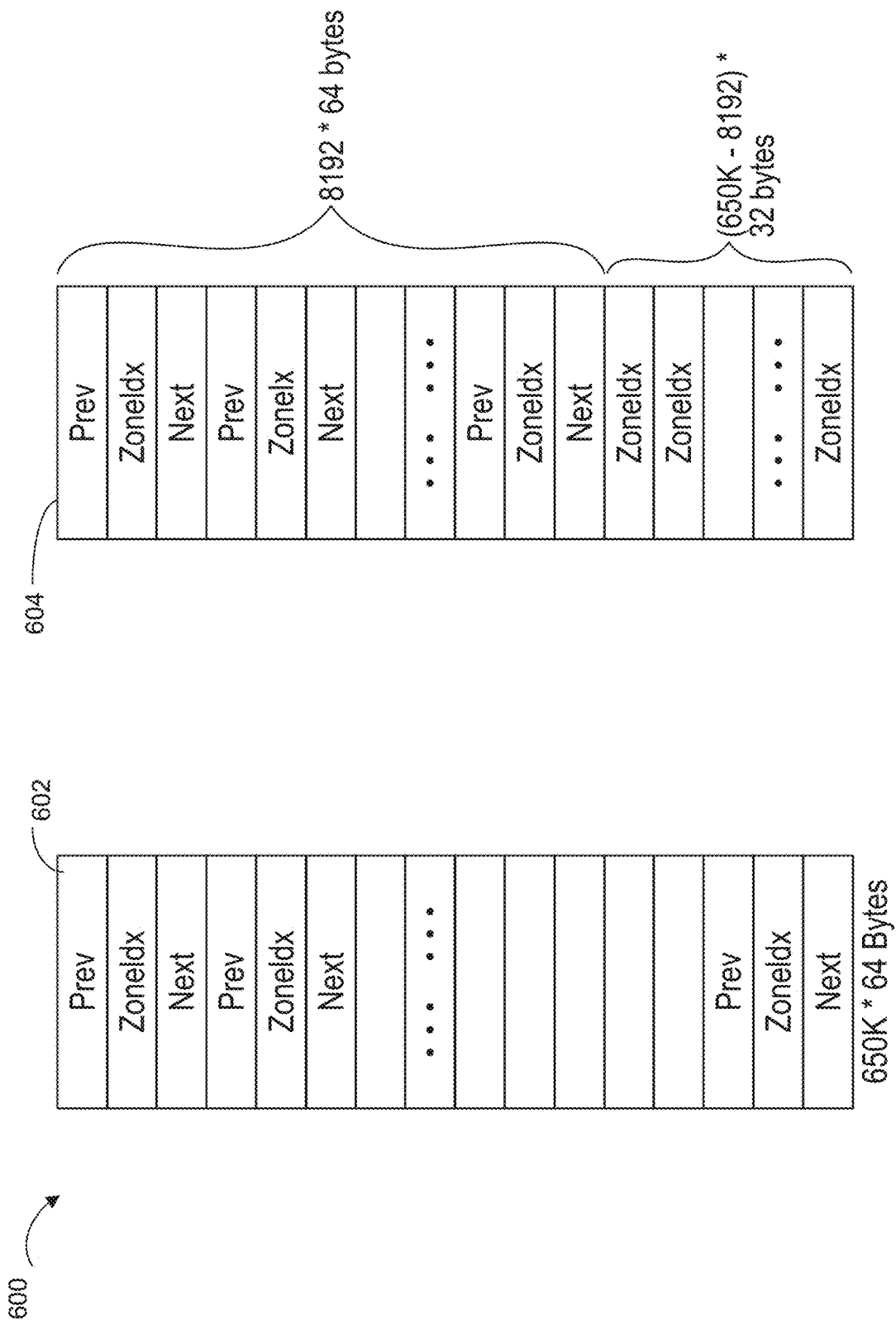
FIG. 6 shows an example comparison between storing an entire double linked list versus storing only a portion of the double linked list followed by an array without the linked list information, according to one or more embodiments.

FIG. 6 shows an example comparison 600 between storing a whole double linked list 602 versus storing only a portion of the double linked list followed by an array without the linked list information 604, according to one or more embodiments. Storing the whole double linked list may require 64 bytes (per entry or node in the double linked list) times 650 KB (number of entries). Storing the double linked list information only for the typical number of staging zones (8192 entries) requires 8192 times 64 bytes, and zone indexes for the other entries in the double linked list requires (650 KB minus 8192 entries) times 32 bytes (zone index size for each entry). Upon power up, if there are any zone indexes are stored, the linked list may be rebuilt for these zones by adding them to the head of the existing linked list. In this way, the techniques described herein may be used to reduce data needed to be saved across power cycle to save PLP budget, which also reduces the cost and risk. As described above, fewer data needs to be saved upon a PLP event, so that a smaller and less expensive capacitor may be used. The more data needs to be saved during a PLP event, higher the risk.

Figure 7:
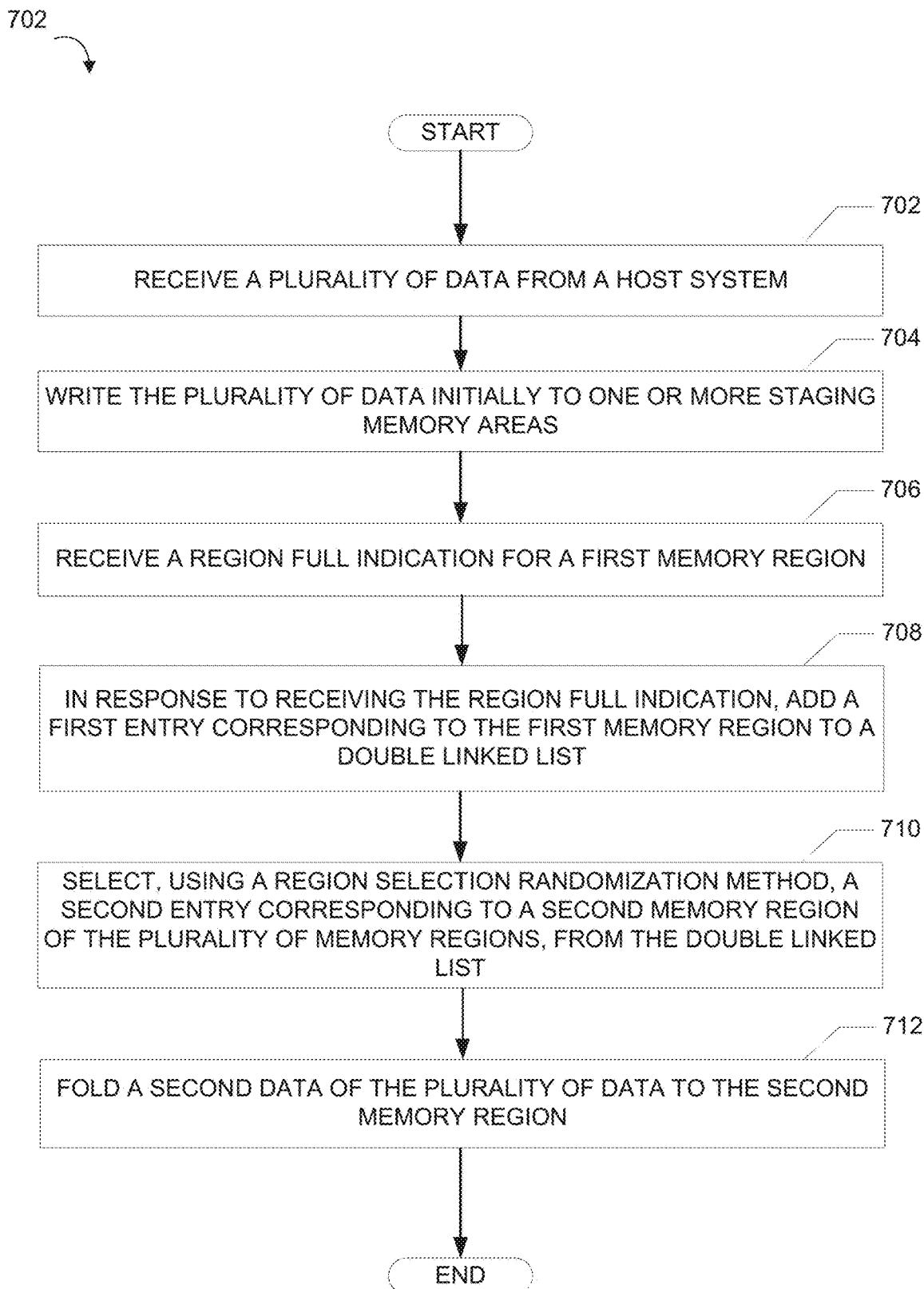
FIG. 7 is a flowchart illustrating an example process for folding zone management optimization in a data storage device, according to one or more embodiments.

It may be instructive to describe the structures shown in FIGS. 1, 2, 3, 4, 5 and 6, with respect to FIG. 7, a flowchart illustrating an example process 700 for folding zone management optimization in a storage device, according to one or more embodiments. One or more blocks of FIG. 7 may be executed by a computing system (including, e.g., a controller of a flash memory, a data storage controller of a data storage system or a solid state storage device (SSD), a processor, or the like). Example of a computing system or a controller may be the controller 101. Similarly, a non-transitory machine-readable medium may include machine-executable instructions thereon that, when executed by a computer or machine, perform the blocks of FIG. 7. The steps of process 700 may be implemented as hardware, firmware, software, or a combination thereof. For example, a data storage device (e.g., the storage device 100) includes a submission queue for receiving host commands from a host system. The data storage device also includes a controller (e.g., the controller 101). The data storage device may include one or more memories (sometimes referred to as device memory, e.g., the flash memories 103). The one or more memories (e.g., one or more NAND memories) may include one or more staging memory areas (e.g., multiple SLC staging blocks) and one or more destination memory areas (e.g., multiple QLC die blocks). The one or more staging memory areas may be of a staging memory type (e.g., SLC), and the one or more destination memory areas may be of a destination memory type (e.g., QLC) that is different from the staging memory type. The staging and destination memory types provide different capacity and different performance characteristics. The one or more destination memory areas may include a plurality of memory regions (e.g., different zones). The data storage device may also include a host interface (e.g., the host interface 105) for coupling the data storage device to a host system (e.g., the host 104).

The controller 101 may be configured to receive (702) a plurality of data from the host system. The controller 101 may also be configured to write (704) the plurality of data initially to the one or more staging memory areas. The controller 101 may also be configured to receive (706) a region full indication for a first memory region of the plurality of memory regions; in response to receiving the region full indication. The controller 101 may also be configured to add (708) a first entry corresponding to the first memory region to a double linked list. The controller 101 may also be configured to select (710), using a region selection randomization method, a second entry corresponding to a second memory region of the plurality of memory regions, from the double linked list. This step assumes that previously, (i) a region full indication for the second memory region was received, and (ii) the second entry was previously added to the double linked list, without imposing an ordering constraint between these events. The controller 101 may also be configured to fold a second data of the plurality of data to the second memory region. This step assumes that the second data was previously received and written to the staging memory area. The plurality of data may include a first data and the second data, and the first data may be associated with the first memory region of the plurality of memory regions and the second data may be associated with the second memory region of the plurality of memory region.

In some aspects, the region selection randomization method may include: selecting a random value between 0 and a minimum of a predetermined maximum die parallelism and a size of the double linked list; and selecting the second entry, from the double linked list, based on the random value. An example of the selection process is illustrated and described above in reference to FIG. 5, according to one or more embodiments.

In some aspects, selecting the second entry may include accessing an entry in the double linked list that is separated from a tail of the double linked list by the random value.

In some aspects, the region full indication for the first memory region may indicate that a size of the first data is sufficient to fill the first memory region fully or that a memory region finish command for the first memory region is issued.

In some aspects, when the region full indication for the first memory region indicates that the memory region finish command for the first memory region is issued and when the size of the first data is not sufficient to fill the first memory region fully, the controller may be further configured to pad the first data when the first data is folded to the first memory region.

In some aspects, the controller 101 may be further configured to remove the second entry corresponding to the second memory region from the double linked list after folding the second data to the second memory region and after verifying the folding. In some aspects, an entry may be removed from the double linked list when the folding is started for a memory region. Some aspects use a separate data structure for folding operations.

In some aspects, the controller 101 may be further configured to fold the second data to the second memory region after (i) occupied space in the one or more staging areas exceeds a first predetermined threshold, or (ii) a number of memory regions of the plurality of memory regions with a full indication reaches a second predetermined threshold.

In some aspects, the controller 101 may be further configured to fold the second data to the second memory region at a rate that at least matches a rate of writing the second data to the one or more staging memory areas.

In some aspects, the controller 101 may be further configured to: in response to an event initiating a shutdown or a power-loss prevention: generate an array based on entries corresponding to a second portion of the double linked list, wherein each array element corresponds to a memory region index for an entry in the second portion without linked list information; and store a first portion of the double linked list and the array to the one or more memories.

In some aspects, the first portion may correspond to twice of maximum active regions of the plurality of memory regions.

In some aspects, the controller 101 may be further configured to: after the shutdown or a loss of power: retrieve the first portion and the array from the one or more memories; regenerate the double linked list based on the first portion and the array; and use the regenerated double linked list for subsequent folds to the plurality of memory regions. Example of these steps are described above in reference to FIG. 6, according to one or more embodiments.

In some aspects, the one or more destination memory areas may include a plurality of die blocks (e.g., the die blocks shown in FIG. 2), and the controller 101 may be further configured to select a destination die block from the plurality of die blocks, for the fold, so as to maximize die parallelism.

In some aspects, the one or more destination memory areas may include a plurality of die blocks, and the controller 101 may be further configured to select a destination block randomly from the plurality of die blocks, for the fold.

In some aspects, the one or more staging memory areas are each organized as a two-dimensional array with each row corresponding to a page and each column corresponding to a different die, and wherein the one or more destination memory areas are each organized across a plurality of dies. Examples of this organization are shown in FIGS. 2 and 4, according to one or more embodiments.

In some aspects, the staging memory type may have better performance but may be smaller in size when compared to the destination memory type.

In some aspects, the controller 101 may be configured to cause storing at least some portion of the second data in non-contiguous pages of the one or more staging memory areas.

Various examples of aspects of the disclosure are described below. These are provided as examples, and do not limit the subject technology.

One or more aspects of the subject technology provide a data storage device that may include one or more memories, a host interface and a controller. The one or more memories may include one or more staging memory areas and one or more destination memory areas. The one or more staging memory areas may be of a staging memory type, and the one or more destination memory areas may be of a destination memory type that is different from the staging memory type. The staging and destination memory types may provide different capacity and different performance characteristics. The one or more destination memory areas may include a plurality of memory regions. The host interface may couple the data storage device to a host system. The controller may be configured to: receive a plurality of data from the host system; write the plurality of data initially to the one or more staging memory areas; receive a region full indication for a first memory region of the plurality of memory regions; in response to receiving the region full indication, add a first entry corresponding to the first memory region to a double linked list; select, using a region selection randomization method, a second entry corresponding to a second memory region of the plurality of memory regions, from the double linked list; and fold a second data of the plurality of data to the second memory region. The plurality of data includes a first data and the second data, and the first data is associated with the first memory region of the plurality of memory regions and the second data is associated with the second memory region of the plurality of memory region.

In some aspects, the region selection randomization method may include: selecting a random value between 0 and a minimum of a predetermined maximum die parallelism and a size of the double linked list; and selecting the second entry, from the double linked list, based on the random value.

In some aspects, selecting the second entry may include accessing an entry in the double linked list that is separated from a tail of the double linked list by the random value.

In some aspects, the region full indication for the first memory region may indicate that a size of the first data is sufficient to fill the first memory region fully or that a memory region finish command for the first memory region is issued.

In some aspects, when the region full indication for the first memory region indicates that the memory region finish command for the first memory region is issued and when the size of the first data is not sufficient to fill the first memory region fully, the controller may be further configured to pad the first data when the first data is folded to the first memory region.

In some aspects, the controller may be further configured to: remove the second entry corresponding to the second memory region from the double linked list after folding the second data to the second memory region and after verifying the folding.

In some aspects, the controller may be further configured to: fold the second data to the second memory region after (i) occupied space in the one or more staging areas exceeds a first predetermined threshold, or (ii) a number of memory regions of the plurality of memory regions with a full indication reaches a second predetermined threshold.

In some aspects, the controller may be further configured to: fold the second data to the second memory region at a rate that at least matches a rate of writing the second data to the one or more staging memory areas.

In some aspects, the controller may be further configured to: in response to an event initiating a shutdown or a power-loss prevention: generate an array based on entries corresponding to a second portion of the double linked list, wherein each array element corresponds to a memory region index for an entry in the second portion without linked list information; and store a first portion of the double linked list and the array to the one or more memories.

In some aspects, the first portion corresponds to twice of maximum active regions of the plurality of memory regions.

In some aspects, the controller may be further configured to: after the shutdown or a loss of power: retrieve the first portion and the array from the one or more memories; regenerate the double linked list based on the first portion and the array; and use the regenerated double linked list for subsequent folds to the plurality of memory regions.

In some aspects, the one or more destination memory areas may include a plurality of die blocks, and the controller may be further configured to select a destination die block from the plurality of die blocks, for the fold, so as to maximize die parallelism.

In some aspects, the one or more destination memory areas may include a plurality of die blocks, and the controller may be further configured to select a destination die block randomly from the plurality of die blocks, for the fold.

In some aspects, the one or more staging memory areas may be each organized as a two-dimensional array with each row corresponding to a page and each column corresponding to a different die, and the one or more destination memory areas may be each organized across a plurality of dies.

In some aspects, the staging memory type may have better performance but may be smaller in size when compared to the destination memory type.

In some aspects, the controller may be configured to: cause storing at least some portion of the second data in non-contiguous pages of the one or more staging memory areas.

In other aspects, methods are provided for folding zone management optimization in data storage devices. According to some aspects, a method may be implemented using one or more controllers for one or more data storage devices. The method may include: receiving a plurality of data from a host system; writing the plurality of data initially to one or more staging memory areas; receiving a region full indication for a first memory region of a plurality of memory regions; in response to receiving the region full indication, adding a first entry corresponding to the first memory region to a double linked list; selecting, using a region selection randomization method, a second entry corresponding to a second memory region of the plurality of memory regions, from the double linked list; and folding a second data of the plurality of data to the second memory region. The plurality of data may include a first data and the second data, and the first data may be associated with the first memory region of the plurality of memory regions and the second data may be associated with the second memory region of the plurality of memory region.

In further aspects, a system may include: means for receiving a plurality of data from a host system; means for writing the plurality of data initially to one or more staging memory areas; means for receiving a region full indication for a first memory region of a plurality of memory regions; means for, in response to receiving the region full indication, adding a first entry corresponding to the first memory region to a double linked list; means for, selecting, using a region selection randomization method, a second entry corresponding to a second memory region of the plurality of memory regions, from the double linked list; and means for folding a second data of the plurality of data to the second memory region. The plurality of data may include a first data and the second data, and the first data may be associated with the first memory region of the plurality of memory regions and the second data may be associated with the second memory region of the plurality of memory region.

Disclosed are systems and methods providing active time-based prioritization in host-managed stream devices. Thus, the described methods and systems provide performance benefits that improve the functioning of a storage device.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   one or more memories comprising one or more staging memory areas and one or more destination memory areas, the one or more staging memory areas being of a staging memory type, and the one or more destination memory areas being of a destination memory type that is different from the staging memory type, wherein the staging and destination memory types provide different capacity and different performance characteristics, and wherein the one or more destination memory areas include a plurality of memory regions;
a host interface for coupling the data storage device to a host system; and
a controller configured to:
receive a plurality of data from the host system;
write the plurality of data initially to the one or more staging memory areas;
receive a region full indication for a first memory region of the plurality of memory regions;
in response to receiving the region full indication, add a first entry corresponding to the first memory region to a double linked list;
select, using a region selection randomization method, a second entry corresponding to a second memory region of the plurality of memory regions, from the double linked list; and
fold a second data of the plurality of data to the second memory region,
wherein the plurality of data includes a first data and the second data, and
wherein the first data is associated with the first memory region of the plurality of memory regions, and the second data is associated with the second memory region of the plurality of memory region.

2. The data storage device of claim 1, wherein the region selection randomization method comprises:
selecting a random value between 0 and a minimum of a predetermined maximum die parallelism and a size of the double linked list; and
selecting the second entry, from the double linked list, based on the random value.

3. The data storage device of claim 2, wherein selecting the second entry comprises:
accessing an entry in the double linked list that is separated from a tail of the double linked list by the random value.

4. The data storage device of claim 1, wherein the region full indication for the first memory region indicates that a size of the first data is sufficient to fill the first memory region fully or that a memory region finish command for the first memory region is issued.

5. The data storage device of claim 4, wherein when the region full indication for the first memory region indicates that the memory region finish command for the first memory region is issued and when the size of the first data is not sufficient to fill the first memory region fully, the controller is further configured to pad the first data when the first data is folded to the first memory region.

6. The data storage device of claim 1, wherein the controller is further configured to:
remove the second entry corresponding to the second memory region from the double linked list after folding the second data to the second memory region and after verifying the folding.

7. The data storage device of claim 1, wherein the controller is further configured to:
fold the second data to the second memory region after (i) occupied space in the one or more staging memory areas exceeds a first predetermined threshold, or (ii) a number of memory regions of the plurality of memory regions with a full indication reaches a second predetermined threshold.

8. The data storage device of claim 1, wherein the controller is further configured to:
fold the second data to the second memory region at a rate that at least matches a rate of writing the second data to the one or more staging memory areas.

9. The data storage device of claim 1, wherein the controller is further configured to:
in response to an event initiating a shutdown or a power-loss prevention:
generate an array based on entries corresponding to a second portion of the double linked list, wherein each array element corresponds to a memory region index for an entry in the second portion without linked list information; and
store a first portion of the double linked list and the array to the one or more memories.

10. The data storage device of claim 9, wherein the first portion corresponds to twice of maximum active regions of the plurality of memory regions.

11. The data storage device of claim 9, wherein the controller is further configured to:
after the shutdown or a loss of power:
retrieve the first portion and the array from the one or more memories;
regenerate the double linked list based on the first portion and the array; and
use the regenerated double linked list for subsequent folds to the plurality of memory regions.

12. The data storage device of claim 1, wherein the one or more destination memory areas include a plurality of die blocks, and the controller is further configured to select a destination die block from the plurality of die blocks, for the fold, so as to maximize die parallelism.

13. The data storage device of claim 1, wherein the one or more destination memory areas include a plurality of die blocks, and the controller is further configured to select a destination die block randomly from the plurality of die blocks, for the fold.

14. The data storage device of claim 1, wherein the one or more staging memory areas are each organized as a two-dimensional array with each row corresponding to a page and each column corresponding to a different die, and wherein the one or more destination memory areas are each organized across a plurality of dies.

15. The data storage device of claim 1, wherein the staging memory type has better performance but is smaller in size when compared to the destination memory type.

16. The data storage device of claim 1, wherein the controller is configured to:
cause storing at least some portion of the second data in non-contiguous pages of the one or more staging memory areas.

17. A method implemented using one or more controllers for one or more data storage devices, the method comprising:
receiving a plurality of data from a host system;
writing the plurality of data initially to one or more staging memory areas;
receiving a region full indication for a first memory region of a plurality of memory regions;
in response to receiving the region full indication, adding a first entry corresponding to the first memory region to a double linked list;
selecting, using a region selection randomization method, a second entry corresponding to a second memory region of the plurality of memory regions, from the double linked list; and folding a second data of the plurality of data to the second memory region, wherein the plurality of data includes a first data and the second data, and wherein the first data is associated with the first memory region of the plurality of memory regions, and the second data is associated with the second memory region of the plurality of memory region.

18. The method of claim 17, wherein the region selection randomization method comprises:

selecting a random value between 0 and a minimum of a predetermined maximum die parallelism and a size of the double linked list; and selecting the second entry, from the double linked list, based on the random value.

19. The method of claim 18, wherein selecting the second entry comprises:

accessing an entry in the double linked list that is separated from a tail of the double linked list by the random value.

20. A system, comprising:

means for receiving a plurality of data from a host system;

means for writing the plurality of data initially to one or more staging memory areas;

means for receiving a region full indication for a first memory region of a plurality of memory regions;

means for, in response to receiving the region full indication, adding a first entry corresponding to the first memory region to a double linked list;

means for, selecting, using a region selection randomization method, a second entry corresponding to a second memory region of the plurality of memory regions, from the double linked list; and means for folding a second data of the plurality of data to the second memory region, wherein the plurality of data includes a first data and the second data, and wherein the first data is associated with the first memory region of the plurality of memory regions, and the second data is associated with the second memory region of the plurality of memory region.

* * * * *